(12) United States Patent
Voisin

(10) Patent No.: US 6,824,019 B2
(45) Date of Patent: Nov. 30, 2004

(54) BOTTOM DISCHARGE CONTAINER

(75) Inventor: Ernest Voisin, Houma, LA (US)

(73) Assignee: Innovatit Seafood Systems, LLC, Houma, LA (US)

( * ) Notice: Subject to any disclaimer, the term of this patent is extended or adjusted under 35 U.S.C. 154(b) by 158 days.

(21) Appl. No.: 10/141,656

(22) Filed: May 8, 2002

(65) Prior Publication Data

US 2002/0166877 A1 Nov. 14, 2002

Related U.S. Application Data

(60) Provisional application No. 60/289,581, filed on May 9, 2001.

(51) Int. Cl.[7] ................................................ B67D 5/06
(52) U.S. Cl. .................................... 222/181.2; 222/509
(58) Field of Search ......................... 222/181.1, 181.2, 222/181.3, 185.1, 509, 545, 546

(56) References Cited

U.S. PATENT DOCUMENTS

| | | | | |
|---|---|---|---|---|
| 999,602 A | * | 8/1911 | Slee | 222/185.1 |
| 3,123,107 A | * | 3/1964 | Kappler | 141/352 |
| 3,257,040 A | * | 6/1966 | Dumbaugh et al. | 222/161 |
| 3,834,591 A | * | 9/1974 | Pirovano | 222/181.3 |
| 5,605,256 A | * | 2/1997 | Fan | 222/181.2 |
| 5,706,985 A | * | 1/1998 | Feer | 222/185.1 |
| 6,131,774 A | * | 10/2000 | Thomas et al. | 222/181.2 |
| 6,164,630 A | * | 12/2000 | Birdsell et al. | 261/18.1 |

* cited by examiner

Primary Examiner—Joseph A. Kaufman
(74) Attorney, Agent, or Firm—Keaty Professional Law Corporation

(57) ABSTRACT

A liquid container has a removable bottom lid and a drain opening formed in the center of the lid. The drain opening is normally closed with a displaceable drain valve that frictionally engages the opening wall and prevents escape of liquid from the container. When the valve is moved upwardly, unseating the valve, the liquid is allowed to drain from the container. The bottom lid is secured to the container wall by a pair of removable pins extending perpendicularly to a longitudinal axis of the container. The lid carries two or more support members that rest on the bottom of the high-pressure processing chamber to prevent damage or scratching of the inner wall of the pressure chamber. The dimensions of the supporting members and the pins do not exceed the inner diameter of the pressure chamber.

16 Claims, 5 Drawing Sheets

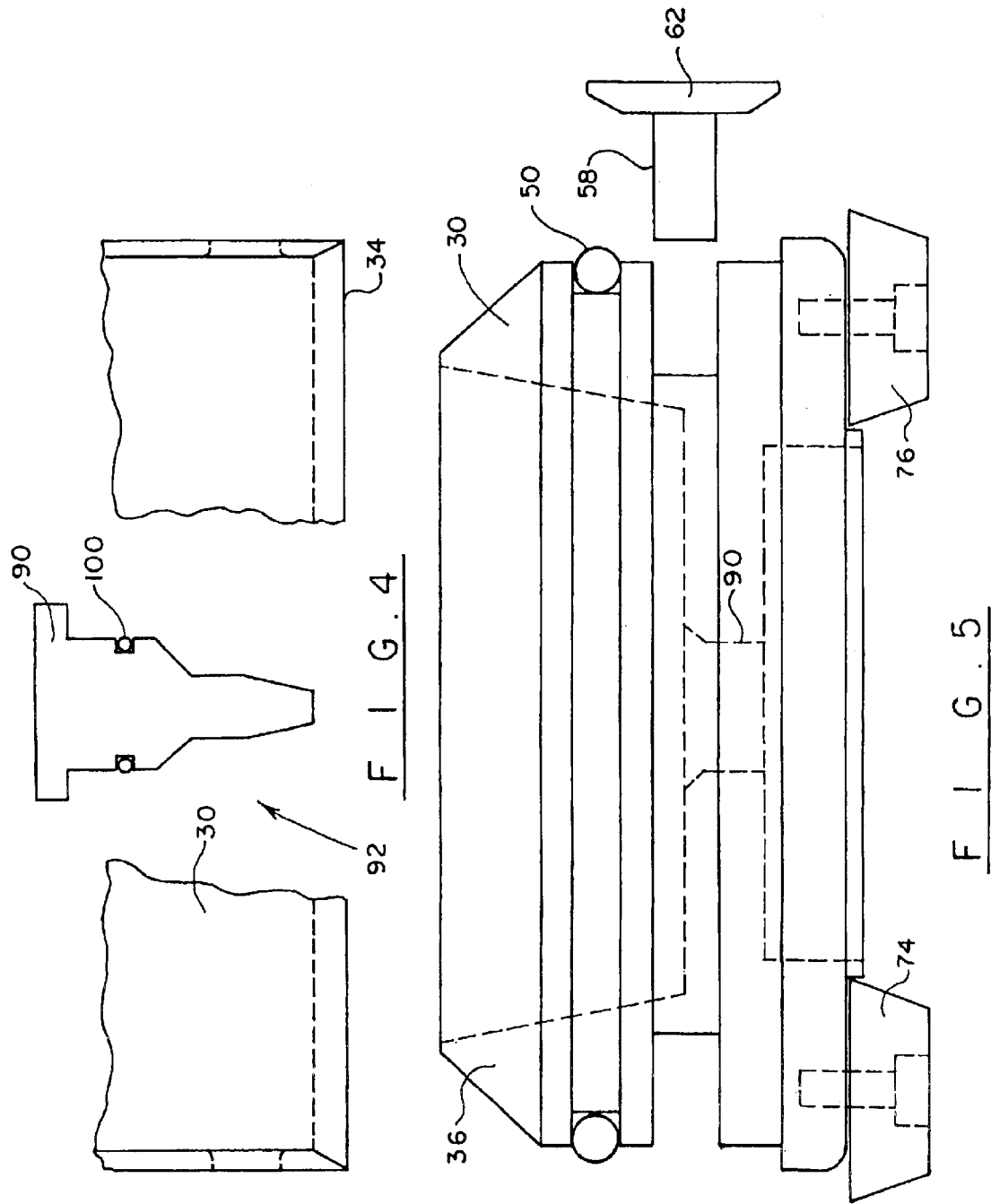

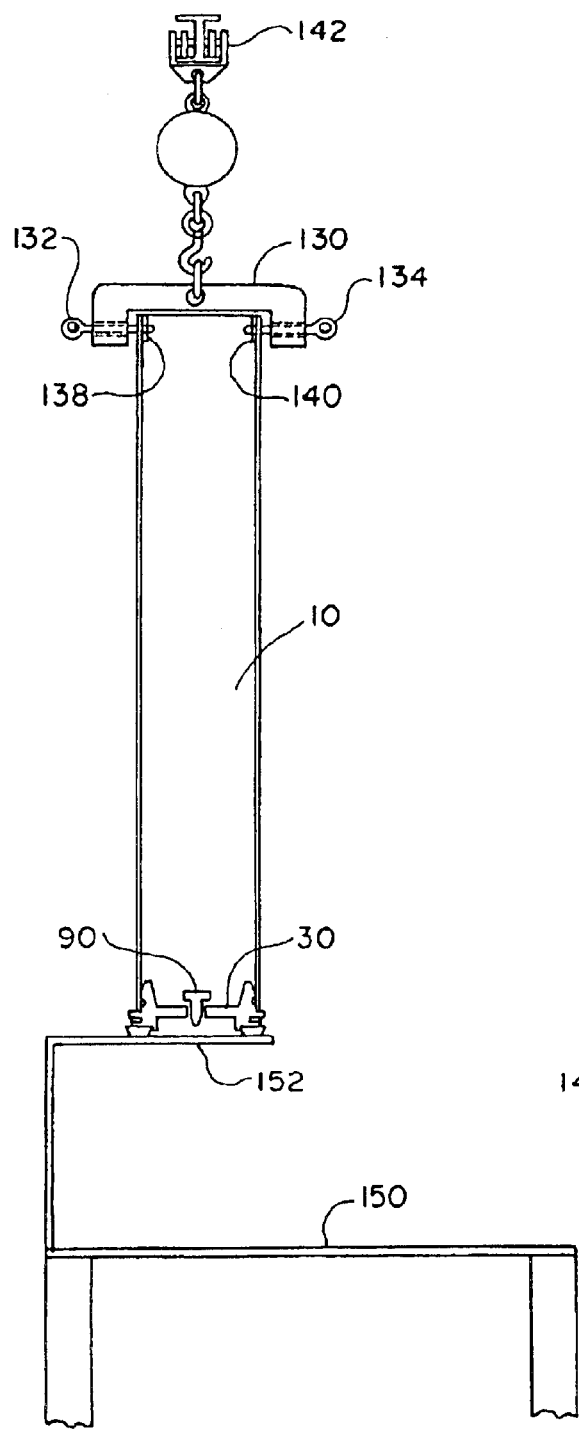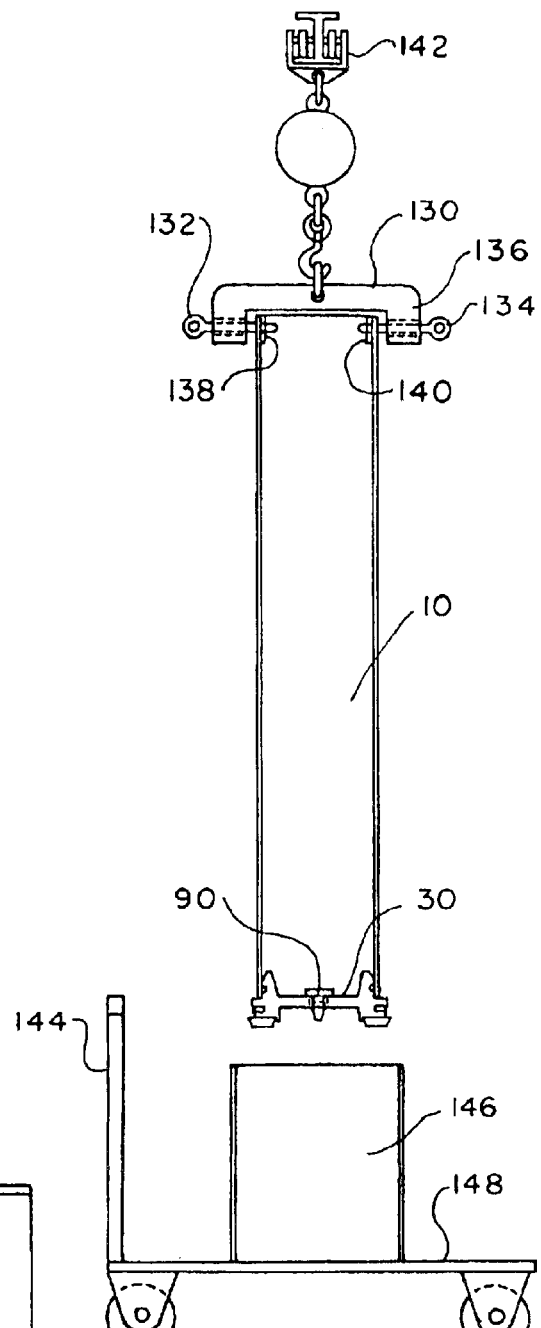

BOTTOM DISCHARGE CONTAINER

CROSS REFERENCE TO RELATED APPLICATIONS

This application is based on and claims priority of my provisional application No. 60/289,581 filed on May 9, 2001 entitled "Quick Removable Bottom Lid to Facilitate Dumping Water and Products from High Pressure Processing Basket," the full disclosure of which is incorporated herein.

BACKGROUND OF THE INVENTION

This invention relates to liquid containers and, more particularly, to a container for positioning in a high-pressure apparatus for processing of food items placed in the container.

High-pressure processing equipment has been used for processing various food items, including fruits, vegetables, meats, etc. Conventionally, the apparatus for high-pressure processing defines a narrow chamber wherein a container with food items to be processed is positioned. The processing containers, in order to take advantage of the valuable chamber space, have diameters, which closely approximate the interior diameter of the pressure chamber. Also, conventionally, the processing containers are made relatively long, in the order of 5–7 feet, such that the bottom of the container sits on the bottom of the chamber and the top extends almost to the top of the chamber upper end.

The top lid of the high-pressure chamber is conventionally provided with a loop that can be engaged by a hoisting mechanism to allow the container to be removed from the high pressure-processing chamber. After the processing is complete, the container is hoisted out of the high-pressure chamber, turned upside down and the contents of the container are dumped onto a processing counter or table, where the liquid from the container is drained out and the product is removed.

Needless to say, elongated containers having about 7 inches in diameter and being 5–7 feet long are heavy when they are full with processing liquid and the loaded food items. The need to turn the container upside down to empty the container onto the processing counter requires additional equipment.

The present invention contemplates elimination of drawbacks associated with a prior art and provision of a container for high-pressure processing that allows to drain the processing medium and unload the product from the bottom of the container without the need to turn the container upside down for dumping.

SUMMARY OF THE INVENTION

It is, therefore, an object of the present invention to provide a container suitable for use in a high-pressure processing apparatus that can be drained and dumped from the bottom.

It is another object of the present invention to provide a container with a bottom plug that is displaced for draining of the container.

It is a further object of the present invention to provide a container for use in high-pressure processing machines, that is easy to operate and inexpensive to manufacture.

These and other objects of the present invention are achieved through a provision of a liquid container with a removable bottom lid and a drain opening formed in the center of the lid. The drain opening is normally closed with a displaceable drain valve that frictionally engages the opening wall and prevents escape of liquid from the container. When the valve is moved upwardly, unseating the valve, the liquid is allowed to drain from the container.

The bottom lid is secured to the container wall by a pair of removable pins extending perpendicularly to a longitudinal axis of the container, through the container wall and into an annular groove formed in an upwardly extending inner extension of the bottom lid. The lid has a downwardly extending outer extension that rests on three or more support members. The support members are securely attached to the bottom lid by bolts or the like.

The supports rest on the bottom of the high-pressure processing chamber to prevent damage or scratching of the chamber interior walls. The dimensions of the supporting members and the pins do not exceed the inner diameter of the pressure chamber.

BRIEF DESCRIPTION OF THE DRAWINGS

Reference will now be made to the drawings, wherein like parts are designated by like numerals, and wherein

FIG. 4 is a detail cross-sectional view showing the drain valve and a cut-away portion of the bottom of the container.

FIG. 5 is a side view of the bottom lid of the apparatus of the present invention.

FIG. 6 is a perspective view showing the container of the present invention being positioned above a processing table ready for dumping the processed product.

FIG. 7 is a perspective view showing the container of the present invention being moved for loading.

DETAILED DESCRIPTION OF THE PREFERRED EMBODIMENT

Figure 1:
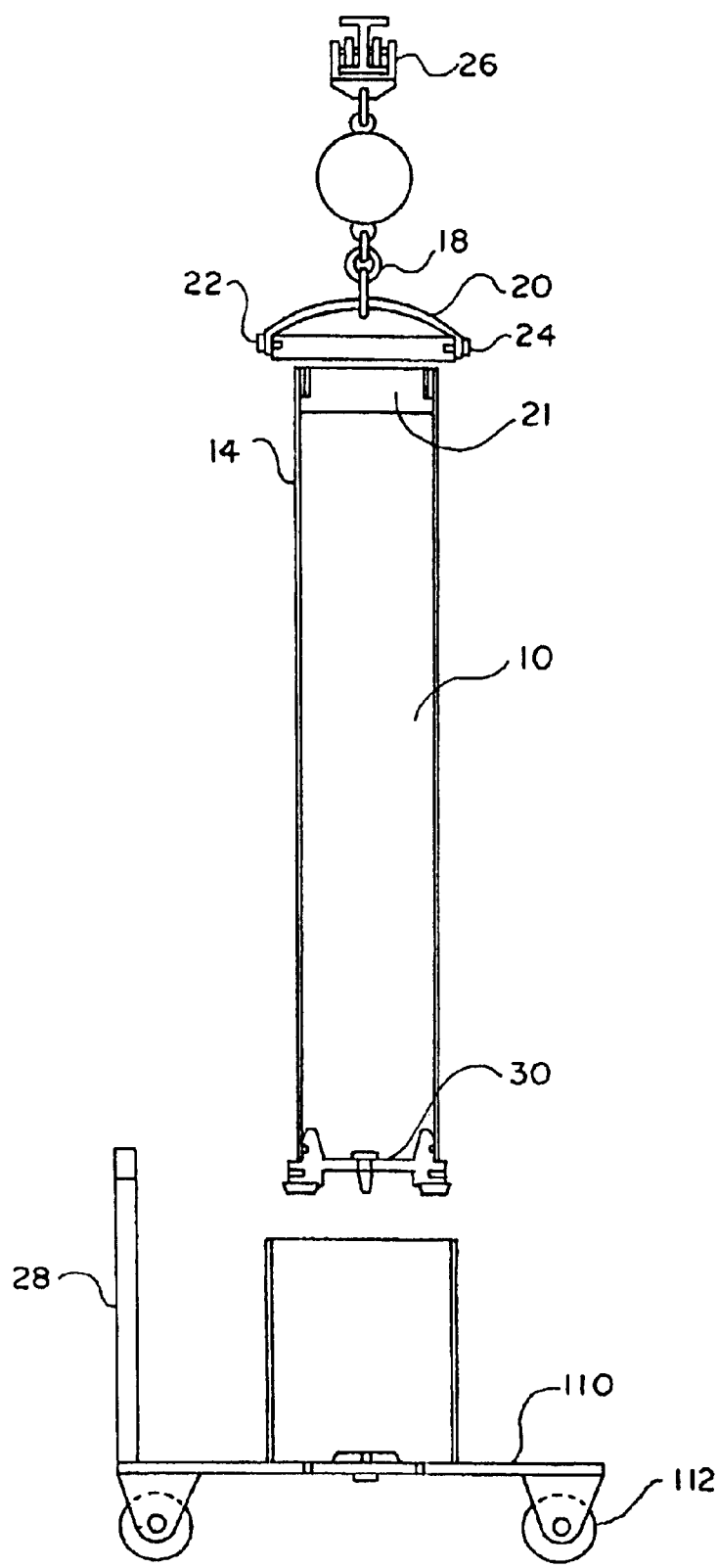
FIG. 1 is a perspective view of the container of the present invention hoisted by a hoisting means.

Turning now to the drawings in more detail, numeral 10 designates the container for use with high-pressure processing equipment. The container 10 has a sidewall 12, an upper end 14 and a bottom end 16. A hoisting hook 18 engages an arcuate removable bracket 20 to allow hoisting of the container 10 from the interior chamber of the high-pressure processing equipment. The bracket 20 carries pins 22, 24 passing through the bracket 20 and engaging a pressure chamber lid 21 that fits into the top of the container 10. A hoisting means, schematically shown in FIG. 1 and designated by numeral 26 moves above the container 10 to lift the container 10 from a high-pressure processing machine (not shown) and deposit the container 10 on a movable cart 28 away from the processing machine.

The bottom of the container 10 is secured with a bottom lid 30 allowing a bottom liquid discharge in accordance with the present invention. As can be seen in more detail in FIG. 2, the bottom lid 30 has an inner surface 32 and an outer surface 34. An annular extension 36 is formed about the inner surface 32 in close proximity to the interior wall 38 of the container 10. The upwardly extending extension 36 has an inner inclined wall 40, a top ridge 42, an inclined first outer surface 44 and a cylindrical second outer surface 46.

An annular groove 48 is formed in the second outer surface 46. A flexible, compressible O-ring 50 is fitted into the groove 48. The O-ring 50 contacts the inner wall 38 of the container 10 and prevents liquid from escaping through the lower portion of the container 10.

A pair of apertures 51 and 52 are formed near the bottom 16 of the side wall 12. The apertures 51 and 52 are each adapted to receive a securing pin 56 and 58, respectively. An annular groove 54 is formed about the exterior surface 46 of the annular extension 36. The pins 56 and 58 extend into the groove 54 when the bottom lid 30 is attached to the wall 12.

Figure 2:
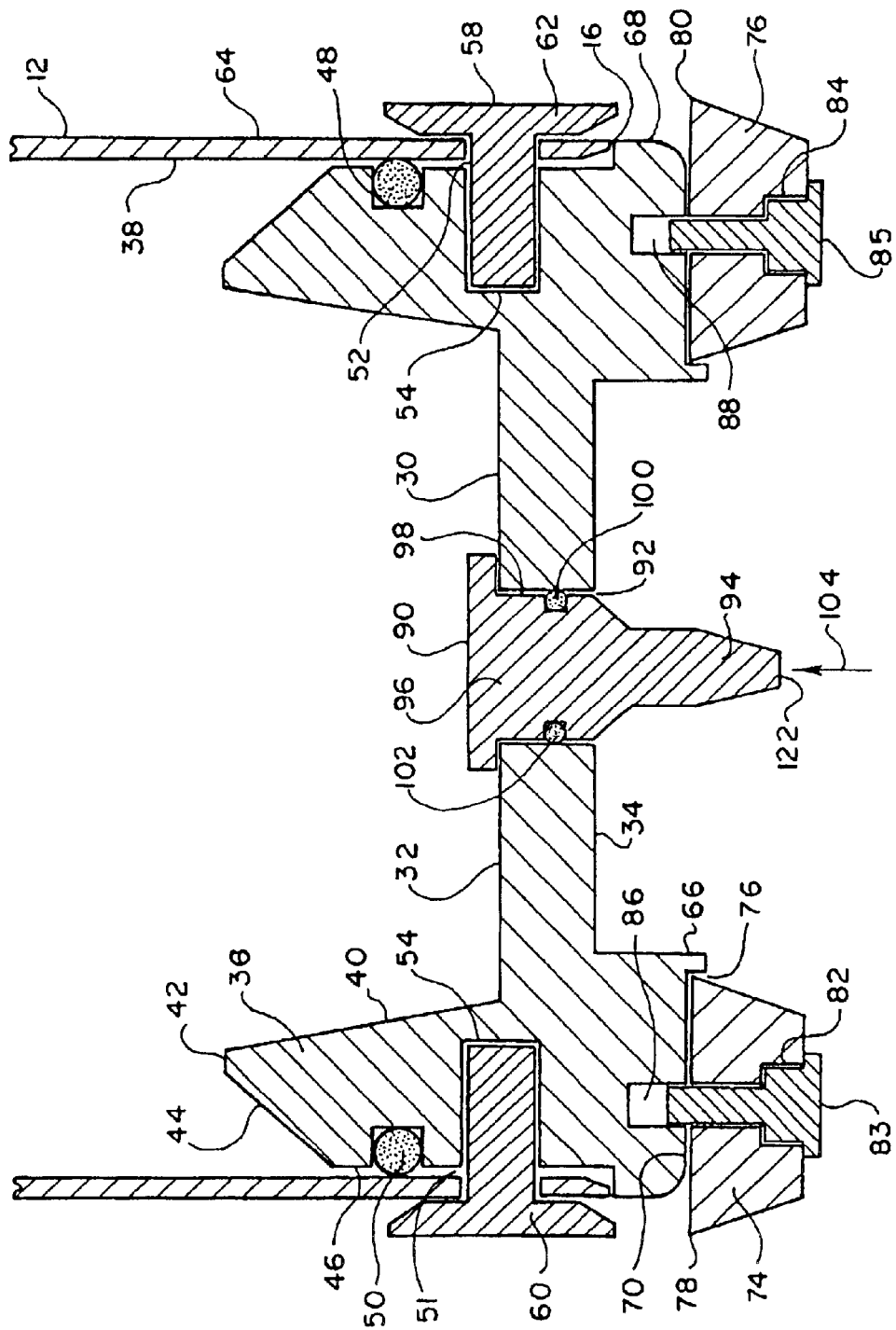
FIG. 2 is a detail cross-sectional view of the bottom of the container showing the bottom discharge lid.

As can be seen in FIG. 2, the pins 56 and 58 have a generally T-shaped cross section. The pins 56 and 58 each have an outwardly extending flat head 60 and 62, respectively. The heads 60 and 62 are greater in diameter than the apertures 51 and 52, such that the heads 60 and 62 abut the exterior wall 64 of the container 10 when the bottom lid is secured to the wall 12.

When the container 10 is positioned in the interior chamber of a high-pressure processing apparatus, the heads 60, 62 of the pins 56 and 58, respectively, are oriented in close proximity to the interior wall of the high-pressure processing chamber, leaving a very small gap and aligning the container 10 in a vertical orientation. This close proximity keeps the pins in place during processing.

The bottom surface 34 of the lid 30 has an annular bottom extension, which is defined by a first vertical annular surface 66, a second annular surface 68 and a bottom surface 70. A cutout is formed in the bottom most surface 70 to define an outwardly facing annular shoulder 72. Two or more supports 74 and 76 are fitted into the cutout formed in the surface 70. In the preferred embodiment, the container 10 is provided with six supports. The supports 74 and 76 contact the bottommost surface 70 and the annular shoulder 72, as shown in FIG. 2.

Each support 74 and 76 has a pre-determined horizontal dimension made not to exceed the interior diameter of the high-pressure processing chamber. The outermost extending edges 78 and 80 of the supports 74 and 76, respectively, are generally aligned or extend to a negligible distance from the flat outer surfaces of the pin heads 60 and 62. The supports 74 and 76 protect the interior walls of the pressure chamber from scratching and damage by the metal liquid container 10.

An opening 82 is formed through the support 74 and extends through the vertical center thereof. A similar vertical opening 84 is formed through the body of the support 76. The openings 82 and 84 are aligned with the openings, or grooves 86 and 88 formed in the bottom surface 70 of the bottom extension of the lid 30. Securing bolts 83, 85 are fitted into the openings 82 and 84 to extend into the openings 86 and 88, respectively. The securing bolts 83, 85 attach the supports 74 and 76 to the bottom lid 30.

When the container 10 is positioned inside the interior chamber of the high-pressure processing machine, the supports 74 and 76 rest near the interior bottom floor of the chamber, the container 10 is aligned in a vertical orientation inside the chamber and is supported by the top lid 21. The supports 74 and 76, as well as the pins 56 and 58, can be made from hard plastic that is resistant to rust and deterioration in a high-pressure processing environment.

A drain valve 90 is fitted in a central opening 92 of the bottom lid 30. The plug 90 has a narrow bottom portion 94 and an enlarged diameter upper portion 96. A reduced diameter middle portion 98 integrally connects the bottom portion 94 and the upper portion 96. An O-ring 100 is fitted in an annular groove 102 formed in the exterior wall of the middle portion 98. The O-ring 100 prevents escape of liquid from the interior of the container 10.

The valve 90 normally closes the bottom lid 30, closing the opening 92 and retaining the processing liquid and the processed food inside the container 10. When it becomes necessary to drain the container 10 and remove the processing liquid, the valve 90 is forced inwardly and upwardly, in the direction of arrow 104, unseating the valve, or plug 90 and moving the enlarged portion 96 away from the surface 32. The liquid from the container 10 is drained through the opening 92, while retaining the processed food items inside the container 10.

The bottom drain of the container 10 facilitates emptying of the container of the processing liquid and eliminates the need for turning of heavy container 10 upside down with the liquid and food inside of it. Once the liquid has been drained, the valve 90 is allowed to remain open until the product has been removed.

Figure 3:
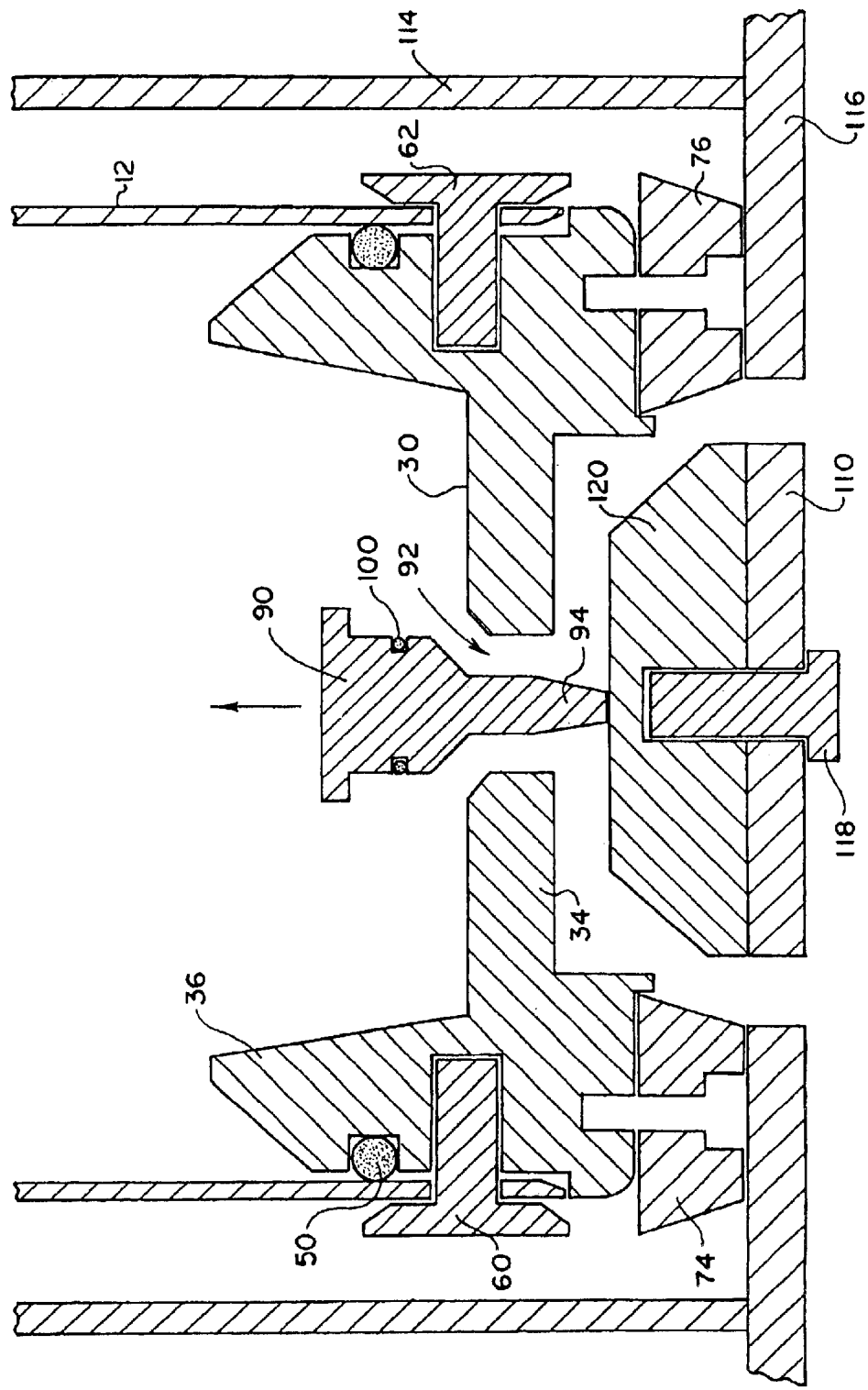
FIG. 3 is a detail cross-sectional view showing the drain valve lifted from the seat to allow draining of the processing medium.

If desired, a specially designed movable cart 28 may be used for receiving the hoisted container 10 while the liquid is emptied from the container. As can be seen in FIGS. 1 and 3, the cart 28 has a platform 110 supported by rotating wheels 112. A cylindrical housing 114 is mounted on the platform 110. The housing 114 has a bottom wall 116 adapted for supporting the supports 74, 76.

Secured by a bolt 118 or other similar means, to the platform 110 is a valve-displacing member 120. The member 120 has a pre-determined vertical dimension that exceeds a distance between the bottom 122 of the valve 90 and the bottom surface 34 of the container 10. When the container 10 is lowered by the hoist means 26 into the housing 114, the container 10 is aligned with the member 120.

By allowing the container 10 to contact the member 120 the operator causes the valve 90 to be lifted and moved inwardly into the interior of the container 10. The opening 92 is open, allowing liquid from the container 10 to drain into the platform 110. The platform 110 is provided with a plurality of openings, allowing the drained liquid to be disposed of into a municipal sewage system. The lid 21 of a pressure chamber is turned 90 degrees and removed from the container 10. While still connected to the hoisting means 26, the lid 21 is transported to a location where another container, similar to the container 10 has been loaded with pressure medium and the food product to be processed.

Once the liquid has been drained, container 10 is moved, with the cart 28 to a processing table. An operator then positions a lifting bracket 130 on the top of the wall 12. The bracket 130 carries a pair of spring-loaded pins 132, 134 that pass through a downwardly extending flange 136 of the bracket 130. A pair of apertures 138, 140 are formed in the wall 12 adjacent to the top of the container 10. The apertures 138, 140 receive the pins 132, 134 therethrough, thereby securing the lifting bracket 130 to the container 10. An overhead hoisting means 142 engages the bracket 130 and lifts the container 10 onto a processing table 150. The processing table 150 may be optionally provided with a base 152 (FIG. 7), on which the container 10 rests during removal of the bottom lid 30.

An operator then removes the pins 56, 58 from their engagement with the bottom lid 30 and the wall 12. The bottom lid 30 is then removed and the contents of the container 10 are dumped on the processing table 150 by raising the container 10 with the hoist. There is no need to turn the container 10 upside down to empty the contents of the container 10 onto the processing table. Once the food items have been removed from the container 10 and the container 10, as well as the lid 30 have been cleaned, the valve 90 is repositioned into the opening 92 and the lid 30 is repositioned on the bottom of the container 10. The pins 56, 58 are then re-engaged with the wall 12 and the bottom lid 30.

The container 10 is then lowered on another movable cart 144 that is provided with a housing 146 adapted to receive the container 10 therein. The cart 144 has a platform 148 that does not have a valve displacement member thereon. The valve 90 remains closed.

The lifting bracket 130 may then be removed from the container 10 and the container 10 moved, while on the cart 144, to a product loading station (not shown). There, the food items to be processed are loaded into the container 10, pressure medium such as water added, and the top sealed with the lid 21. The container 10 is then deposited into a pressure chamber and the pressure cycle begins again.

Many changes and modifications can be made in the design of the present invention without departing from the spirit thereof. I, therefore, pray that my rights to the present invention be limited only by the scope of the appended claims.

I claim:

1. A liquid container, comprising:
    a cylindrical body having an open bottom end;
    a bottom lid detachably secured on the bottom end, said bottom lid having an upwardly extending inner extension, said inner extension being provided with an upper annular groove about a mid-portion thereof, and wherein a compressible O-ring is fitted into said upper groove, said bottom lid being provided with a lower annular groove below said upper annular groove, and wherein a lower portion of said body is provided with at least two apertures extending through a side wall of said body, and wherein removable securing pins are inserted through said at least two apertures into said lower annular groove to detachably secure said bottom lid to said body; and
    a displaceable valve fitted in the bottom lid to allow draining of liquid from said container body when said valve is lifted from the valve's normally seated position in said bottom lid.

2. A liquid container for use within a pressure chamber of a high-pressure processing machine, said container comprising:
    a cylindrical body having an open bottom end and an open top end;
    a bottom lid detachably secured on the bottom end, the bottom lid having an upwardly extending inner extension, said inner extension being provided with an upper annular groove about a mid-point thereof, and wherein a compressible O-ring is fitted into said upper groove between an inner wall of said container and the inner extension, said bottom lid is provided with a lower annular groove below said upper annular groove, a lower portion of said body is provided with at least two apertures extending through a side wall of said body, and wherein removable securing pins are inserted through said at least two apertures into said lower annular groove to detachably secure said bottom lid to said body; and
    a displaceable valve fitted in the bottom lid, said valve moving between a normally closed position in said opening and an open position when said valve is lifted to allow draining of liquid from said container body.

3. The apparatus of claim 2, wherein said cylindrical body is configured to fit into the pressure chamber of a high-pressure processing machine.

4. The apparatus of claim 3, wherein said securing pin has a pre-determined horizontal dimension not to exceed the diameter of the pressure chamber.

5. A liquid container for use within a pressure chamber of a high-pressure processing machine, said container comprising:
    a cylindrical body having an open bottom end and an open top end configured for engagement with a lid of the high-pressure processing machine;
    a bottom lid detachably secured on the bottom end, the bottom lid having an upwardly extending inner extension, said inner extension being provided with an upper annular groove about a mid-point thereof, and wherein a compressible O-ring is fitted into said upper annular groove between an inner wall of said container and the inner extension, said inner extension is provided with a lower annular groove, a lower portion of said body is provided with at least two apertures extending through a side wall of said body, and wherein removable securing pins are inserted through said at least two apertures into said lower annular groove to detachably secure said bottom lid to said body; and
    a displaceable valve fitted in a central opening formed in said bottom lid, said valve moving between a normally closed position in said opening and an open position when said valve is lifted to allow draining of liquid from said container body, said valve being provided with a compressible O-ring fitted into an annular groove formed in a middle portion of said valve to prevent escape of liquid from said container during high-pressure processing.

6. An assembly for draining a liquid container, comprising:
    a liquid container body having an open bottom end;
    a bottom lid detachably secured on the bottom end, said bottom lid carrying a displaceable valve movable between a normally closed position, closing a drain opening formed in the bottom lid and an open position, unseated from said opening, said bottom lid being provided with an upwardly extending inner extension, said inner extension being provided with an upper annular groove about a mid-point thereof, and wherein a compressible O-ring is fitted into said upper annular groove between an inner wall of said container and the inner extension, said bottom lid being further provided with a lower annular groove and wherein a lower portion of said container is provided with at least two apertures extending through a side wall of said container body; and
    a valve displacement member supported on a horizontal surface exteriorly of said liquid container, said valve displacement member forcing said valve upwardly and inwardly when a bottom of said valve contacts the valve displacement member, thereby opening the drain opening and allowing draining of liquid from said liquid container.

7. The assembly of claim 6, wherein removable securing pins are inserted through said at least two apertures into said lower annular groove to detachably secure said bottom lid to a side wall of said container body.

8. An assembly for draining a pressure container, comprising:
    a liquid container body having an open bottom end and a top end and adapted for engagement by an independent hoisting means;
    a bottom lid detachably secured on the bottom end, said bottom lid having a central drain opening, said bottom lid carrying a displaceable valve movable between a normally closed position, closing the drain opening and an open position, unseated from said opening;

a horizontal platform for receiving said container;

a valve displacement member supported on said platform, said valve displacement member forcing said valve upwardly and inwardly when a bottom of said valve contacts the valve displacement member, thereby opening the drain opening and allowing draining of liquid from said liquid container;

a removable bracket for engaging the top end of said container body, said bracket being provided with an engagement member adapted for engagement by the hoisting means, said bracket being detachably secured on said container by spring-loaded pins.

9. A method of emptying a liquid container of a high-pressure processing apparatus loaded with a liquid medium and a solid medium, said apparatus having a pressure chamber with a lid, the method comprising the following steps:

providing a tubular container body having a top closed by the lid of the pressure chamber;

providing a removable bottom lid engageable with a bottom of the container body, said bottom lid having a displaceable drain valve;

engaging the lid of the pressure chamber by an independent hoisting means and lifting said container body from the pressure chamber;

displacing said drain valve by causing the valve to move upwardly and inwardly in relation to said container body, while forming a liquid drain opening in said bottom lid;

allowing the liquid medium to drain from said container body; and removing said bottom lid and allowing the solid medium to exit the container body under gravity, while the container body is retained in an upright position.

10. The method of claim 9, wherein said bottom lid is secured to a bottom portion of the container body with removable pins.

11. The method of claim 9, further comprising the step of providing a valve displacement member outside of said container body.

12. The method of claim 11, wherein said drain valve rests on said valve displacement body while the liquid medium is drained from said container body and said bottom lid is secured on said container body.

13. The method of claim 9, further comprising the step of providing a movable cart with a platform, said platform carrying said valve displacement member.

14. The method of claim 13, further comprising the step of removing said lid of the pressure chamber after the liquid medium was allowed to drain from the container body.

15. The method of claim 14, further comprising the step of providing a lifting bracket and engaging a top portion of the container body with said lifting bracket and then elevating said container body over an independently-standing processing table prior to removing said bottom lid, thereby depositing said solid medium on the processing table.

16. The method of claim 15, further comprising a step of providing a base elevated above said processing table, and placing said container body on said base prior to removing said bottom lid.

* * * * *